United States Patent [19]

Schimperna et al.

[11] Patent Number: 5,817,720

[45] Date of Patent: Oct. 6, 1998

[54] POLYOLEFINS MODIFIED WITH AN UNSATURATED POLYFUNCTIONAL MONOMER CONTAINING AN IMIDE GROUP AND AN ESTER GROUP

[75] Inventors: Giuliana Schimperna, Milan; Maria Antonella Pastorino, Genoa; Maria Caldararo, Trecate; Francesco Toscani; Maurizio Sguaita, both of Cameri, all of Italy

[73] Assignee: Enichem S.p.A., Milan, Italy

[21] Appl. No.: 797,208

[22] Filed: Feb. 11, 1997

[30] Foreign Application Priority Data

Feb. 27, 1996 [IT] Italy ................ MI96A0362

[51] Int. Cl.⁶ .................. C08F 265/10; C08F 267/10
[52] U.S. Cl. ........................... 525/282; 525/66

[58] Field of Search ................................. 525/282

[56] References Cited

U.S. PATENT DOCUMENTS 5,466,753  11/1995  Marczinke et al. ............ 525/193

*Primary Examiner*—Ana Woodward
*Attorney, Agent, or Firm*—Oblon, Spivak, McClelland, Maier & Neustadt, P.C.

[57] ABSTRACT

Polyolefins modified by radical grafting with an unsaturated polyfunctional compound containing an imide group and an ester group having general formula (I):

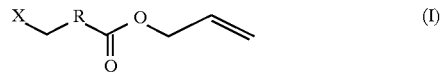

21 Claims, No Drawings

POLYOLEFINS MODIFIED WITH AN UNSATURATED POLYFUNCTIONAL MONOMER CONTAINING AN IMIDE GROUP AND AN ESTER GROUP

The present invention relates to polyolefins modified with an unsaturated polyfunctional monomer containing an imide group and an ester group.

More specifically, the present invention relates to polyolefins modified by radical grafting with an unsaturated polyfunctional monomer containing an imide group and an ester group and a process for their preparation.

The invention also relates to the above unsaturated polyfunctional monomers containing an imide group and an ester group and a process for their preparation.

Polyolefins, being non-polar products, have poor affinity with the traditional materials such as, for example, glass and metals in general, and are incompatible with polar synthetic polymers such as, for example, polyesters and polyamides. They also have a poor adhesion capacity to the above traditional materials and to the above synthetic polymers.

The preparation of composite materials or laminates starting from polyolefins as such and from the above traditional materials or synthetic polymers, is therefore quite difficult.

This difficulty has recently given rise to intense research to obtain polyolefins having improved surface properties.

Reactions relating to the functionalization of polyolefins using both unsaturated dicarboxylic acids and their derivatives, and unsaturated imides, have been described in literature.

U.S. Pat. No. 4,147,746 describes the modification reaction in the molten state of polyethylene with derivatives of maleic, itaconic and citraconic acid.

In turn, the article by Lee and Russel published in "European Polymer Journal" (1989), Vol. 25, pages 709–712, describes the radical grafting reaction in solution of N-methyl-maleimide on polyethylenes and hydrocarbons with a low molecular weight.

Japanese patent application JP 52030546 on the other hand describes a process for the preparation of grafted N-butylmaleimide-propylene copolymers in the presence of aromatic solvents.

Another example of the use of derivatives of maleimide in the radical grafting of polyolefins is described in European patent application EP 262.796. The above patent application claims blends prepared starting from a polyolefin directly coextruded with a polyamide in the presence of cyclohexylmaleimide and a radical initiator, having good mechanical characteristics, for the car industry.

However, when the modification reaction of the polyolefins must take place maintaining the physicochemical and rheological characteristics of the starting polyolefin as unvaried as possible, the use of maleimidic products as grafting agents may prove to be unsatisfactory.

It is known in fact that maleimides favour the cross-linking reaction of polyolefins competing with the grafting reaction. For example, Tawney et al. in "Journal of Applied Polymer Science" (1964), Vol. 8, pages 2281–2298, describe the use of N-phenylmaleimide combined with peroxides, in the vulcanization of ethylene-propylene rubbers.

The Applicant has now found that the use of particular imides in the grafting reaction of polyolefins allows the production, with the same concentration of radicalic initiator, of polyolefins functionalized with an imide group, effectively reducing the cross-linking phenomena of the substrate. There are consequently no uncontrolled increases in molecular weight or formation of microgels and long chain branchings which can influence the processability of the end-product.

The present invention therefore relates to polyolefins modified by radical grafting with an unsaturated polyfunctional compound containing an imide group and an ester group having general formula (I):

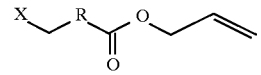

wherein:
R represents a $C_1$–$C_{10}$ alkyl group linear or branched or a phenyl group, said phenyl group also optionally substituted;
X represents a succinimide group having formula (II):

or a phthalimide group having formula (III):

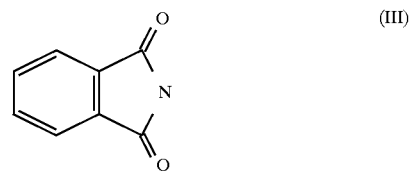

Examples of $C_1$–$C_{10}$ alkyl groups are methyl, ethyl, n-butyl, isobutyl, n-decyl, etc.

When the phenyl groups are described as being optionally substituted, this means that said groups can be substituted with one or more halogen atoms such as, chlorine, fluorine, bromine or iodine, and/or with one or more groups, the same or different, selected from $C_1$–$C_6$ alkyl groups linear or branched, $C_1$–$C_4$ alkoxy groups linear or branched, $C_1$–$C_4$ carboxyalkyl groups linear or branched.

Examples of $C_1$–$C_6$ alkyl groups are methyl, ethyl, n-butyl, isopropyl, etc.

Examples of $C_1$–$C_4$ alkoxy groups are: methoxy, ethoxy, etc.

Examples of $C_1$–$C_4$ carboxyalkyl groups are: carbomethoxy, carboethoxy, carbo-t-butoxy, carbo-iso-propoxy, etc.

Polyolefins which can be used for the purposes of the present invention are both homopolymers of ethylene and copolymers of ethylene with propylene, butene and other unsaturated aliphatic hydrocarbons. The preferred copolymers of ethylene are those containing up to 50% of higher olefins such as, for example, propylene, 1-butene, 4-methyl-pentene, 1-hexene, 1-octene. The above copolymers can additionally contain up to 5% of diolefins or triolefins selected from those which are commonly used in ethylene/propylene terpolymers such as, for example, 5-ethylidene-2-norbornene, methylene-norbornene, 1,4-hexadiene-vinyl-norbornene.

Specific examples of polyolefins which can be used for the purposes of the present invention are high density polyethylene (HDPE), linear low density polyethylene (LLDPE), low density and very low density polyethylene (LDPE, ULDPE, VLDPE), ethylene/propylene elastomeric copolymers known by the abbreviations EPM (ethylene/propylene dimer) and EPDM (ethylene/propylene/diene terpolymer).

Preferred polyolefins for the purpose are linear high density polyethylene (HDPE), linear low density polyethylene (LLDPE), low density polyethylene (LDPE), a mixture of ethylene/propylene copolymer and ethylene/propylene/diene terpolymer. For this purpose, in the following examples, Flexirene® FG20 produced by EniChem S.p.A. is used.

The polyolefins which are useful for the purposes of the present invention must have a density of at least 0.85, preferably of between 0.885 and 0.97. These polyolefins are prepared according to any of the methods known in the art.

The polyfunctional compounds having general formula (I) which can be used for the present invention have a high boiling point, preferably more than 200° C., are thermally stable under the reaction conditions and are preferably not capable of polymerizing under these conditions.

Preferred polyfunctional compounds having general formula (I) for the purposes of the present invention are those wherein R represents a $C_1$–$C_{10}$ alkyl group linear or branched or a phenyl group or a substituted phenyl group.

Specific examples of polyfunctional compounds having general formula (I) which can be used for the purpose are:

allyl ester of 5-(1,3-dioxo-1,3-di-hydro-isoindol-2-yl) pentanoic acid (VI1);

allyl ester of 11-(2,5-dioxo-1,3-di-hydro-pyrrolidin-1-yl) undecanoic acid (VI2);

allyl ester of (2,5-dioxo-pyrrolidin-1-yl)acetic acid (VI3)

allyl ester of 4-(1,3-dioxo-1,3-di-hydro-isoindol-2-yl) butyric acid (VI4);

allyl ester of (1,3-dioxo-1,3-di-hydro-isoindol-2-yl)acetic acid (VI5);

allyl ester of 4-(1,3-dioxo-1,3-di-hydro-isoindol-2-yl) benzoic acid (VI6).

The modified polyolefins of the present invention are prepared by means of a process which comprises reacting in the molten state:

100 parts by weight of polyolefin;

0.1–10 parts by weight of a grafting agent consisting of a polyfunctional compound having general formula (I);

0.01–0.5 parts by weight of a radical initiator;

for a time of between a few seconds and 20 minutes, preferably between 1 minute and 10 minutes, at a temperature of between 140° C. and 240° C., preferably between 180° C. and 210° C.

The radical initiator useful for the purposes of the present invention can be any organic peroxide which, at a temperature within the range specified above, has an average lifetime of at least 50 seconds.

Organic peroxides having general formula (IV) are preferably used:

$$R_2-\underset{\underset{R_1}{|}}{\overset{\overset{R_1}{|}}{C}}-O-O-\underset{\underset{R_1}{|}}{\overset{\overset{R_1}{|}}{C}}-R_2 \quad (IV)$$

wherein:

$R_1$ represents a $C_1$–$C_{10}$ alkyl group linear or branched, said alkyl group also unsaturated by the presence of double or triple C—C bonds, and also optionally substituted with $C_1$–$C_{10}$ alkyl or peroxyalkyl groups; a phenyl group;

$R_2$ represents a $C_1$–$C_{10}$ alkyl group linear or branched.

Examples of radical initiators which can be used in the present invention are di-cumylperoxide, 2,5-dimethyl-2,5-di(t-butylperoxy)-hexane, 2,5-dimethyl-2,5-di(t-butylperoxy)-3-hexyne, di-t-butylperoxide, etc.

Preferred radical initiators for the purposes of the present invention are di-cumylperoxide and di-t-butylperoxide.

The above process can also be carried out in longer times than those indicated provided they do not induce degradation phenomena on the substrate or grafting agent.

For the purposes of the present invention the above process can be carried out indifferently in a reactor suitable for the purpose, in a batch mixer or in an extruder.

There are no prejudicial elements which can exclude mixing the substrate, grafting agent and radicalic initiator before feeding the mixer or extruder at temperatures within the range indicated above.

When the grafting agent is in the liquid state at room temperature, it is preferable to feed the mixture containing the grafting agent and radicalic initiator directly into the molten mass of the substrate at the reaction temperature.

When the grafting agent is in the solid state at room temperature, it is preferable, on the other hand, to disperse it together with the radicalic initiator on a fraction of polyolefin dissolving it with a low-boiling solvent such as, for example, acetone, which is subsequently removed by evaporation under vacuum. The mixture thus obtained is fed directly into the molten mass of the remaining substrate.

At the end of the above process, if required by the following application, antioxidants, light and heat stabilizers, nucleating agents, organic and inorganic dyes or other additives, selected from those known in the art, can be added.

The modified polyolefins of the present invention can be used as such or mixed with non-modified polyolefins or with inorganic phases such as, for example, glass fibres, kaolin, mica, etc.

The above polyolefins can be used in the production of coating materials and laminates. In particular, they are used in the preparation of polymeric alloys with polyamides to improve their impact strength.

A further object of the present invention relates unsaturated polyfunctional compounds containing an imide group and an ester group having general formula (I):

$$X\diagdown R \diagdown \underset{\underset{O}{\parallel}}{C} \diagdown O \diagdown \diagup \!\!\!\!\diagdown \quad (I)$$

wherein:

R represents a $C_1$–$C_{10}$ alkyl group linear or branched or a phenyl group, said phenyl group also optionally substituted;

X represents a succinimide group having formula (II):

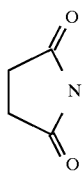

or a phthalimide group having formula (III):

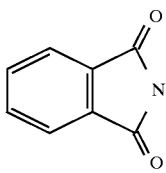

The polyfunctional compounds having general formula (I) were synthesized by nucleofilic substitution of the potassium salt of the succinimide having formula (V) or phthalimide having formula (VI) on the allylester of the bromoacid having general formula (VII), according to the following reaction scheme:

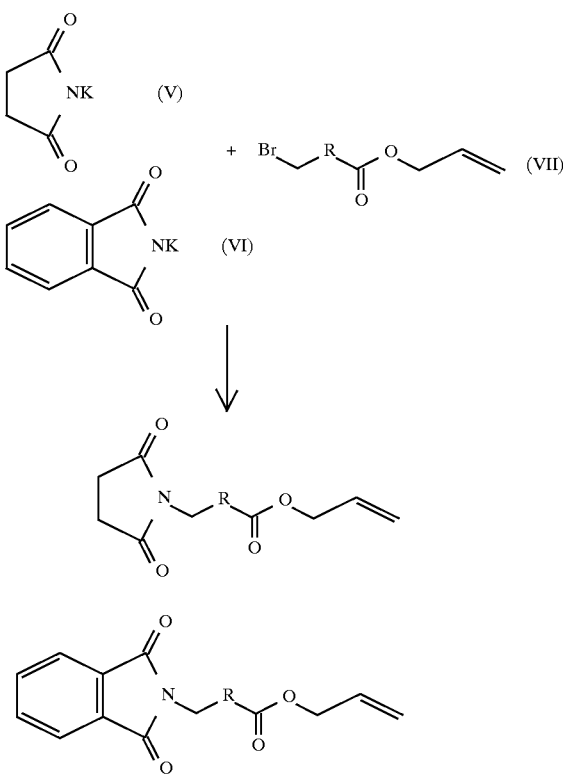

wherein R has the same meaning described above.

The reaction is carried out in the presence of a dipolar aprotic solvent such as, for example, N,N-dimethylformamide, at a temperature between 50° C. and 120° C., preferably between 60° C. and 90° C. In the case of succinimide, the presence of a base such as, for example, potassium carbonate is also necessary.

The allyl esters of bromoacids having general formula (VII) are products which can be easily synthesized with procedures known in the art such as, for example, that described in: "Collective Organic Synthesis" (1960), Vol. III, page 610.

Some illustrative examples are provided for a better understanding of the present invention and for its embodiment, but do not limit the scope of the invention itself in any way.

EXAMPLE 1

Preparation of the allyl ester of (2,5-dioxo-pyrrolidin-1-yl)acetic acid (VI3).

(1) Preparation of the allyl ester of 2-bromo-acetic acid.

22 g (0.16 moles) of 2-bromo-acetic acid, 12.8 ml (0.188 moles) of allyl alcohol, 60 ml of toluene and 300 mg of p-toluenesulfonic acid are charged into a flask equipped with a magnetic stirrer, thermometer, Markusson and cooler.

The solution is heated to reflux temperature and the reaction water is distilled azeotropically. This is continued until no further water is developed.

Ethyl ether is added and the organic phase is washed with a saturated aqueous solution of sodium bicarbonate and subsequently with water.

After anhydrifying the organic phase on sodium sulfate, it is filtered and the solvent is evaporated under vacuum.

28.6 g of the allyl ester of 2-bromo-acetic acid are thus obtained (yield of 99%).

(2) Preparation of the allyl ester of (2.5-di-oxopyrrolidin-1-yl)acetic acid (VI3).

9.2 g (92.99 mmoles) of succinimide and 30 ml of N,N-dimethylformamide (DMF) are charged into a flask equipped with a thermometer and cooler; the reaction mixture is brought to 60° C. and 28.6 ml (158.8 mmoles) of allyl ester of 2-bromo-acetic acid prepared as described above are added and, subsequently, 12.7 g of potassium carbonate in small portions.

At the end of the addition the reaction mixture is kept at 60° C. for a further 3 hours. The progress of the reaction is controlled by gas-chromatography (GC), on an SPB-5 column. After the reaction mass has been cooled to room temperature, water is added, the mixture is extracted three times with ethyl ether and the organic phase is washed with water until neutral. It is anhydrified on sodium sulfate, filtered and the solvent is evaporated under vacuum.

11.6 g (58.8 mmoles) of allyl ester of (2,5-dioxopyrrolidin-1-yl)acetic acid (VI3) are thus obtained (yield of 64%).

For the preparation of the allyl ester of 11-(2,5-dioxo-1,3-dihydro-pyrrolidin-1-yl)undecanoic acid (VI2), the same procedure is adopted as described above using the corresponding bromo ester.

EXAMPLE 2

Preparation of the allyl ester of (1,3-dioxo-1,3-dihydro-isoindol-2-yl)acetic acid (VI5).

84.8 g (0.47 moles) of allyl ester of 2-bromo-acetic acid, 58 g (0.31 moles) of potassium phthalimide and 60 ml of N,N-dimethylformamide (DMF) are charged into a flask equipped with a magnetic stirrer, heating plate and thermometer. The reaction mixture is heated, under stirring, to 90° C. and is maintained at this temperature for 3 hours.

The progress of the reaction is controlled by gas-chromatography (GC), on an SPB-5 column. After the reaction mass has been cooled to room temperature, water is added, the mixture is extracted three times with ethylacetate and the organic phase is washed with water until neutral. It is anhydrified on sodium sulfate, filtered and the solvent is evaporated under vacuum.

65 g (330 mmoles) of allyl ester of (1,3-dioxo-1,3-dihydro-isoindol-2-yl)acetic acid (VI5) are thus obtained (yield of 84%).

For the preparation of the allyl ester of 5-(1,3-dioxo-1,3-dihydro-isoindol-2-yl)-pentanoic acid (VI1) and the allyl ester of 4-(1,3-dioxo-1,3-dihydro-isoindol-2-yl)butyric acid (VI4), the same procedure is adopted as described above using the corresponding bromo esters.

EXAMPLE 3

Preparation of the allyl ester of 4-(1,3-dioxo-1,3-dihydro-isoindol-2-yl)benzoic acid (VI6).

(1) Preparation of the allyl ester of 4-bromo-benzoic acid.

50.2 g (0.248 moles) of 4-bromo-benzoic acid, 21 ml (0.298 moles) of allyl alcohol, 300 ml of toluene and 502 mg of p-toluenesulfonic acid are charged into a flask equipped with a magnetic stirrer, thermometer, Markusson and cooler.

The solution is heated to reflux temperature and the reaction water is distilled azeotropically. This is continued until no further water is formed.

The mixture is cooled to room temperature, ethyl ether is added and the organic phase is washed with a saturated aqueous solution of sodium bicarbonate and subsequently with water.

After anhydrifying the organic phase on sodium sulfate, it is filtered and the solvent is evaporated under vacuum.

60 g of the allyl ester of 4-bromo-benzoic acid are thus obtained (yield of 99%).

(2) Preparation of the allyl ester of 4-(1,3-dioxo-1,3-dihydro-isoindol-2-yl)benzoic acid (VI).

11.5 g (0.095 moles) of allyl ester of 4-bromo-benzoic acid prepared as described above, 8.4 g (0.114 moles) of phthalimide, 8.2 g (0.114 moles) of copper oxide and 50 ml of collidine are charged into a flask equipped with a thermometer, cooler and device for the inlet and outlet of nitrogen.

The reaction mixture is heated, under stirring, to 170° C. and is maintained at this temperature for 24 hours controlling the progress of the reaction by gas-chromatography (GC), on an SPB-5 column.

After cooling the reaction mass to 25° C., it is diluted with methylene chloride and the organic phase is washed with an aqueous solution of hydrochloric acid (2N) and subsequently with water until neutral. After evaporation of the solvent under vacuum, the product obtained is purified by chromatography on silica gel using hexane/ethyl acetate as eluant in a ratio of 7/3.

11.2 g (43.2 mmoles) of allyl ester of 4-(1,3-dioxo-1,3-dihydro-isoindol-2-yl)benzoic acid (VI6) are thus obtained (yield of 40%).

EXAMPLE 4

31.7 g of LLDPE FG20 (Flexirene® FG20 produced and sold by EniChem SpA) are fed, in an inert atmosphere, into the chamber of a Brabender type batch roll mixer (W50 E), preheated to 180° C.

When the time necessary for the mixture to melt has passed, about 4 minutes, a mixture containing 2.7 g of allyl ester of 5-(1,3-dioxo-1,3-dihydro-isoindol-2-yl)pentanoic acid (VI1) and 0.13 g of di-t-butylperoxide (TBP) are injected into the molten mass. After about 5 minutes, the material is removed from the mixer and cooled.

The modification which has taken place is verified on a film, compression moulded at 180° C. and extracted with acetone to remove the non-reacted product, by infra-red analysis which is carried out with a Perkin Elmer Model 1800 FTIR spectrometer.

EXAMPLE 5

The same procedure described in Example 4 is followed, but the functionalization is carried out using 31.7 g of LLDPE FG20 (Flexirene® produced and sold by EniChem SpA) to which a mixture containing 0.037 g of di-cumylperoxide (DCP) and 2.8 g of allyl ester of 5-(1,3-dioxo-1,3-dihydro-isoindol-2-yl)-pentanoic acid (VI1) is added.

EXAMPLE 6

The same procedure described in Example 4 is followed, but the functionalization is carried out using 31.7 g of LLDPE FG20 (Flexirene® produced and sold by EniChem SpA) to which a mixture containing 0.14 g of di-t-butylperoxide (TBP) and 2.8 g of allyl ester of 11-(2,5-dioxo-pyrrolidin-1-yl)undecanoic acid (VI2) is added.

EXAMPLE 7

25.7 g of LLDPE FG20 (Flexirene® FG20 produced and sold by EniChem SpA) are fed, in an inert atmosphere, into the chamber of a Brabender type batch roll mixer (W50 E), preheated to 180° C.

When the time necessary for the load to melt has passed, about 4 minutes, a further 6 g of LLDPE FG 20 on which a mixture containing 2.1 g of allyl ester of (2,5-dioxo-pyrrolidin-1-yl)acetic acid (VI3) and 0.039 g of di-cumylperoxide (DCP) had previously, by dissolution in acetone and subsequent evaporation under vacuum, been dispersed. After about 5 minutes, the material is removed from the mixer and cooled.

The subsequent treatment on the sample obtained is carried out as described in Example 4.

EXAMPLE 8

The same procedure described in Example 7 is followed, but the functionalization is carried out using 25.7 g of LLDPE FG20 (Flexirene® produced and sold by EniChem SpA) to which a mixture containing 0.049 g of di-cumylperoxide (DCP) and 2.9 g of allyl ester of 4-(1,3-dioxo-1,3-dihydro-isoindol-2-yl)butyric acid (VI4) is added.

EXAMPLE 9

The same procedure described in Example 7 is followed, but the functionalization is carried out using 25.7 g of LLDPE FG20 (Flexirene® produced and sold by EniChem SpA) to which a mixture containing 0.049 g of di-cumylperoxide (DCP) and 1.45 g of allyl ester of (1,3-dioxo-1,3-dihydro-isoindol-2-yl)acetic acid (VI5) is added.

EXAMPLE 10

174.8 g of LLDPE FG20 (Flexirene® FG20 produced and sold by EniChem SpA) are fed, in an inert atmosphere, into the chamber of a Brabender type batch roll mixer (W50 E), preheated to 180° C.

When the time necessary for the load to melt has passed, about 4 minutes, a further 40.8 g of LLDPE FG 20 on which a mixture containing 8.86 g of allyl ester of (1,3-dioxo-1,3-dihydro-isoindol-2-yl)acetic acid (VI5) and 0.336 g of di-cumylperoxide (DCP) had previously, by dissolution in acetone and subsequent evaporation under vacuum, been dispersed. After about 5 minutes, the material is removed from the mixer and cooled.

The subsequent treatment on the sample obtained is carried out as described in Example 4.

EXAMPLE 11

Example 10 was reproduced to prove the repeatability of the functionalization reaction.

EXAMPLE 12

The same procedure described in Example 7 is followed, but the functionalization is carried out using 25.7 g of LLDPE FG20 (Flexirene® produced and sold by EniChem SpA) to which a mixture containing 0.039 g of di-cumylperoxide (DCP) and 1.57 g of allyl ester of 4-(1, 3-dioxo-1,3-dihydro-isoindol-2-yl)benzoic acid (VI6) is added.

Table 1 indicates the quantity of imide bound and the grafting yield of the modified samples obtained as described in Examples 4–12.

The differences between the molecular weight values, determined in 1,2,4-trichlorobenzene at 135° C., of the samples obtained as described in Examples 4–12 and of the sample as such are all lower than the experimental error of the measurement technique.

TABLE 1

| EXAMPLE Nr. | IMIDE BOUND (g/100 g of product) | GRAFTING YIELD (%) |
| --- | --- | --- |
| 4 | 1.80 | 21.0 |
| 5 | 1.40 | 15.6 |
| 6 | 1.80 | 21.0 |
| 7 | 1.00 | 14.5 |
| 8 | 1.80 | 20.0 |
| 9 | 1.45 | 30.0 |
| 10 | 1.25 | 30.0 |
| 11 | 1.30 | 31.6 |
| 12 | 1.20 | 24.5 |

EXAMPLE 13

A mixture containing 100 parts by weight of modified LLDPE obtained by operating under the conditions described in Example 10 and 900 parts by weight of Nylon 6 (Radilon 27), is mixed, at 250° C., in an rw Haake system 90 twin-screw extruder, with a screw rate of 100 r.p.m.

The mixture thus obtained is dried and injection moulded to obtain standard test samples on which morphological analysis is carried out. Test samples starting from 10/90 mixtures of LLDPE as such and Nylon 6, obtained by operating under the same conditions described above, are prepared analogously.

EXAMPLE 14

The same conditions are adopted as described in Example 13 using a mixture containing 200 parts by weight of modified LLDPE obtained by operating under the conditions described in Example 11 and 800 parts by weight of Nylon 6 (Radilon 27). Test samples starting from 20/80 mixtures of LLDPE as such and Nylon 6, obtained by operating under the same conditions described above, are prepared analogously.

Morphological analysis of the fracture surfaces of the samples obtained from the mixtures 90/10 and 80/20 of Nylon 6/modified LLDPE, carried out by SEM electron microscope, show a significant reduction in the particle dimensions of LLDPE with respect to the analogous mixtures 90/10 and 80/20 of Nylon 6/LLDPE as such. This reduction in the particle dimensions of the dispersed phase can be attributed to lesser interfacial stress due to the improved phase compatibility.

We claim:

1. A polyolefin modified by radical grafting with an unsaturated polyfunctional compound containing an imide group and an ester group having formula (I):

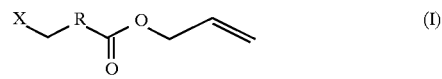

wherein:

R represents a $C_1$–$C_{10}$ alkyl group linear or branched or a substituted or unsubstituted phenyl group;

X is selected from the group consisting of a succinimide group having formula (II):

and a phthalimide group having formula (III):

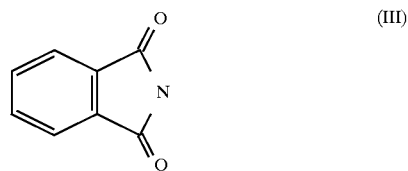

2. The modified polyolefin according to claim 1, wherein the $C_1$–$C_{10}$ alkyl group is selected from the group consisting of methyl, ethyl, n-butyl, isobutyl and n-decyl.

3. The modified polyolefin according to claim 1, wherein the substituted phenyl group is substituted with one or more radicals selected from the group consisting of chlorine, fluorine, bromine, iodine, a $C_1$–$C_6$ alkyl group linear or branched, a $C_1$–$C_4$ alkoxy group linear or branched and a $C_1$–$C_4$ carboxyalkyl group linear or branched; and wherein said radicals are the same or different.

4. The modified polyolefin according to claim 3, wherein the $C_1$–$C_6$ alkyl group is selected from the group consisting of methyl, ethyl, n-butyl and isopropyl.

5. The modified polyolefin according to claim 3, wherein the $C_1$–$C_4$ alkoxy group is selected from the group consisting of methoxy and ethoxy.

6. The modified polyolefin according to claim 3, wherein the $C_1$–$C_4$ carboxyalkyl group is selected from the group consisting of carbomethoxyl, carboethoxyl, carbo-t-butoxyl and carbo-iso-propoxyl.

7. The modified polyolefin according to claim 1 wherein the polyolefin is selected from the group consisting of a homopolymer of ethylene, a copolymer of ethylene with an unsaturated hydrocarbon selected from the group consisting of propylene, butene, other unsaturated aliphatic hydrocarbon and mixtures thereof.

8. The modified polyolefin according to claim 7, wherein the copolymers of ethylene are those containing up to 50% of a higher olefin selected from the group consisting of propylene, 1-butene, 4-methyl-pentene, 1-hexene and 1-octene and up to 5% of a diolefin or triolefin.

9. The modified polyolefin of claim 8, wherein said diolefin or triolefin is selected from the group consisting of 5-ethylidene-2norbornene, methylenenorbornene and 1,4-hexadiene-vinyl-norbornene.

10. The modified polyolefin according to claim 1, wherein the polyolefin is selected from the group consisting of high density polyethylene (HPDE), linear low density polyethylene (LLDPE), low density polyethylene (LDPE), ultralow density polyethylene (ULDPE) very low density polyethylene (VLDPE), and an ethylene/propylene elastomeric copolymer.

11. The polyolefin according to claim 10, wherein the polyolefin is selected from the group consisting of high density polyethylene (HDPE), linear low density polyethylene (LLDPE), low density polyethylene (LDPE), and a mixture of ethylene/propylene copolymer with ethylene/propylene/diene terpolymer.

12. The modified polyethylene of claim 10, wherein said ethylene/propylene elastomeric copolymer is selected from the group consisting of ethylene/propylene copolymer (EPM) and ethylene/propylene/diene terpolymer (EPDM).

13. The modified polyolefin according to claim 1, wherein the polyolefin has a density of at least 0.85.

14. The modified polyolefin according to claim 13, wherein the density is between 0.885 and 0.97.

15. The modified polyolefins according to claim 11 wherein the polyfunctional compound having formula (I) is:

allyl ester of 5-(1,3-dioxo-1,3-di-hydro-isoindol-2-yl) pentanoic acid (VI1);

allyl ester of 11-(2,5-dioxo-1,3-di-hydro-pyrrolidin-1-yl) undecanoic acid (VI2);

allyl ester of (2,5-dioxo-pyrrolidin-1-yl) acetic acid (VI3);

allyl ester of 4-(1,3-dioxo-1,3-di-hydro-isoindol-2-yl) butyric acid (VI4);

allyl ester of (1,3-dioxo-1,3-di-hydro-isoindol-2-yl)acetic acid (VI5);

allyl ester of 4-(1,3-dioxo-1,3-di-hydro-isoindol-2-yl) benzoic acid (VI6).

16. A process for the preparation of modified polyolefin according to any of the previous claims which comprises reacting in the molten state:

100 parts by weight of polyolefin;
0.1–10 parts by weight of a grafting agent consisting of a polyfunctional compound having formula (I);
0.01–0.5 parts by weight of a radical initiator;

for a time of between a few seconds and 20 minutes, at a temperature of between 140° C. and 240° C.

17. The process according to claim 16, wherein the reaction time is between 1 minute and 10 minutes, and the reaction temperature is between 180° C. and 210° C.

18. The process according to claim 16, wherein the radical initiator is any organic peroxide which, at a temperature within the range specified above, has an average lifetime of at least 50 seconds.

19. The process according to claim 18, wherein the organic peroxide has formula (IV):

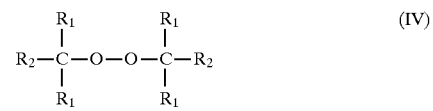

wherein:

$R_1$ represents a $C_1$–$C_{10}$ alkyl group linear or branched, said alkyl group optionally unsaturated by the presence of double or triple C—C bonds, and optionally substituted with $C_1$–$C_{10}$ alkyl or peroxyalkyl groups; a phenyl group;

$R_2$ represents a $C_1$–$C_{10}$ alkyl group linear or branched.

20. The process according to claim 18 or 19, wherein the radical initiator is selected from di-cumylperoxide, 2,5-dimethyl-2,5-di(t-butylperoxy)-hexane, 2,5-dimethyl-2,5-di(t-butylperoxy)-3-hexyne, di-t-butylperoxide.

21. The process according to claim 20, wherein the radical initiator is selected from di-cumylperoxide and di-t-butylperoxide.

* * * * *